United States Patent [19]

Takashima et al.

[11] Patent Number: 4,879,658
[45] Date of Patent: Nov. 7, 1989

[54] NAVIGATION SYSTEM USING ANGULAR RATE SENSOR

[75] Inventors: Makoto Takashima; Yoshihito Aoki; Takahiro Oikawa, all of Shizuoka, Japan

[73] Assignee: Yazaki Corporation, Japan

[21] Appl. No.: 154,106

[22] Filed: Feb. 9, 1988

[30] Foreign Application Priority Data

Feb. 10, 1987 [JP] Japan .................................. 62-27279
Feb. 10, 1987 [JP] Japan .................................. 62-27280
Feb. 10, 1987 [JP] Japan .................................. 62-27281

[51] Int. Cl.$^4$ ............................................. G06F 15/50
[52] U.S. Cl. ................................. 364/449; 340/988; 340/995; 73/178 R
[58] Field of Search ................... 364/443, 444, 449; 73/178 R; 342/450, 451; 340/988, 990, 995

[56] References Cited

U.S. PATENT DOCUMENTS

| | | | |
|---|---|---|---|
| 4,763,270 | 8/1988 | Itoh et al. | 340/990 |
| 4,774,671 | 9/1988 | Itoh et al. | 340/988 |
| 4,782,447 | 11/1988 | Ueno et al. | 364/449 |
| 4,792,907 | 12/1988 | Ikeda et al. | 340/990 |
| 4,796,189 | 1/1989 | Nakayama et al. | 340/990 |

Primary Examiner—Gary Chin
Attorney, Agent, or Firm—Wigman & Cohen

[57] ABSTRACT

In a navigation system by which vehicle travel locations are detected by an angular rate sensor and a distance sensor and the detected vehicle travel locations are corrected so as to be displayed along a map road, the display errors are improved by matching a vehicle turn point behind a route judge area to a map branch point; a route judge area is adjusted according to route conditions to an adjacent branch point or detected travel angles or a distance between two adjacent branch points. Further, non-corrected vehicle location data are displayed only within the route judge area to remove unnatural vehicle location display.

12 Claims, 13 Drawing Sheets

AREA PASS JUDGE VALUE

AREA PASS JUDGE VALUE  EXTENSION

AREA PASS JUDGE VALUE  REDUCTION

NAVIGATION SYSTEM USING ANGULAR RATE SENSOR

BACKGROUND OF THE INVENTION

1. Field of the Invention

The present invention relates to a navigation system using an angular rate sensor, and more specifically to a navigation system by which automotive vehicle travel locations are detected by an angular rate sensor and a distance sensor and the detected vehicle locations are projected on a displayed map road, so that the vehicle travel display moves along a predetermined route on the map.

Since this system can operate independently without the need of other auxiliary means (e.g. radio signals), this system is effective in an an area where radio navigation systems cannot operate reliably, such as an urban area or other areas subject to radio interference.

2. Description of the Prior Art

The applicant has already proposed a dead reckoning and map correlation system for automotive vehicle tracking, which uses an angular rate sensor and a distance sensor, in Japanese Unexamined Published (Kokai) Patent Application No. 60-48600, entitled Vehicle Position Detecting System. In this system, current vehicle locations can be intermittently detected on the basis of vehicle travel distance data and vehicle travel angle data ((detected by an angular rate (velocity) sensor)); and the calculated vehicle locations are projected onto the roads displayed on a digital map (including road intersections and curves) previously prepared by inputting digital map data to a CPU through a keyboard so that the vehicle travel motion can track a road displayed on the map.

In the navigation system of this kind, it is extremely difficult to correct the error between the current location and the map road, so that the displayed vehicle motion can correctly track a predetermined road on the digital map. The correction method of the above-mentioned prior-art system will be described with reference the attached drawings. In FIG. 1(A), $P'(X, Y)$ denotes coordinates of the current detected vehicle location point (not displayed); $P_1(X_1, Y_1)$ denotes coordinates of an intersection of roads; $S_1$ denotes a distance between the detected vehicle location data $P'$ and the intersection data $P_1$; $\theta$ denotes an angle data subtended by the two lines $\overline{P_1P'}$ and $\overline{P_1P_{01}}$. Further, the dashed curve denotes an actual vehicle travel route (not displayed).

The above distance data $S_1$ and the angle data $\theta$ are detected for each predetermined distance to obtain the current detected vehicle location $P'(X, Y)$. In FIG. 1(A), since the calculated position $P'$ deviates from the route R, this position $P'$ is projected on the route R for correction. That is, a corrected vehicle location $P_{01}(X_{01}, Y_{01})$ is calculated in accordance with the following expression:

$X_{01} = X_1 + S_1 \cos \theta$ $Y_{01} = Y_1 + S_1 \sin \theta$ $S_1 = \sqrt{(X_1-X)^2 + (Y_1+Y)^2}$ The above-mentioned correction method is fairly effective when the vehicle travels along a straight road. However, when the vehicle turns along an intersection or a curved road, various problems arise as follows:

(1) 1st problem

In this method, it is possible to reduce a correction error at an intersection as shown in FIG. 1(B). In more detail, even if the vehicle turns at an intersection as shown by dashed lines, since the distance $D_e$ can automatically be corrected at the intersection, the correction error between the actual and corrected points is small.

However, when the vehicle travels along an inflection as shown by dashed lines in FIG. 1(C), since $D_e$ cannot be corrected, there exists a large error e.

(2) 2nd problem

In this system, a route judge area as shown in FIG. 2(A) is determined at each branch point $P_1$ to determine a turning point for the vehicle. That is, when a distance $L_1$ between the current vehicle location $P_{00}$ and the succeeding branch point $P_1$ becomes less than a predetermined value $L_1$, since this indicates that the vehicle approaches a branch point $P_1$, a revised distance calculation begins to detect that the vehicle has passed through the point $P_1$. And, when the calculated distance exceeds a predetermined value $(L_1+L_2)$, it is determined that the vehicle has turned at the branch point $P_1$ by detecting the travel angle.

In the prior-art method, however, since this route judge area $(L_1+L_2)$ is fixed, when an adjacent point $P_2$ is close to the point $P_1$, there exists a problem in that the vehicle passes beyond the adjacent point $P_2$ before the vehicle turns at the point $P_1$, thus resulting in route change judgement error. Further, there exists another problem in that it is impossible to determine a sufficient route judgement distance between the two points $P_1$ and $P_2$.

Further, there exists another problem in that when a distance between two points $P_1$ and $P_s$ is long and a large error occurs, the calculated distance to the point is quite different from an actual distance, so that it is impossible to detect a route judge area when the vehicle has passed through the point. The above-mentioned error between the calculated map distance and the actual distance is produced when a curved road R is approximated by a straight line $\overline{P_1 P_2}$ as shown in FIG. 2(B). That is, the curved actual distance is larger than the straight map distance when the vehicle travels from $P_1$ to $P_2$, and shorter than the straight map distance when the vehicle travels from $P_2$ to $P_1$. Therefore, where these road inflections continue as shown in FIG. 2(C), there exists a problem such that cumulative errors are produced.

When the above error is produced, since there exists a difference in distance between the map branch point and the actual branch point, it is impossible to detect route change data within a route judge area JE.

FIG. 2(D) shows an example where the vehicle turns at the actual branch point $B_A$ before the route judge area JE of the map branch point $B_M$ is detected, because the distance between two map branch points is longer than the actual distance. FIG. 2(E) shows an example where the vehicle turns at the actual branch point $B_A$ after the vehicle has passed through the route judge area JE of the map branch point $B_M$, because the distance between two map branch points is shorter than the actual distance.

(3) 3rd problem

In this system, straight routes between two points (e.g. intersections, branch points, turning corners, etc.) are calculated on the basis of map data including coordinates of these points and point numbers adjacent to each point, and the current vehicle travel locations are displayed along these calculated straight routes. Further, in order to judge a change in vehicle travel direction, a route judge area JE is provided at each point $P_1$ as shown in FIGS. 3(A) and 3(B).

The third problem is how to display the current vehicle location within this route judge area JE.

In the prior-art system, the current vehicle location is continuously displayed along the route on which the vehicle runs toward the point $P_1$, as shown by white dots in FIG. 3(A) or fixedly displayed at the point $P_1$ as shown by a black dot in FIG. 3(B).

Therefore, in the case shown in FIG. 3(A), since the vehicle location is displayed even on an extension of the route $\overline{P_0 \, P_1}$, there exists a problem in that a location mark is dislocated from the route when the vehicle turns at a T-shaped crossing or displayed as if the vehicle travels straight in spite of the fact that the vehicle turns right or left at a crossroads, thus resulting in a display error.

Further, in the case shown in FIG. 3(B), since the display mark jumps from the point $P_1$ to a corrected location after a route change has been determined, there exists another problem in that the location is displayed in an unnaturally appearing manner.

SUMMARY OF THE INVENTION

With these problems in mind, therefore, it is the general objective of the present invention to provide a navigation system using an angular rate sensor which can accurately display the current vehicle travel location on a map by minimizing display errors.

More specifically, it is a first object of the present invention to provide a navigation system which can eliminate a display error caused at each branch point.

It is a second object of the present invention to provide a navigation system which can reliably determine area judge values so as to provide an indication that the vehicle has reached and passed through a route judge area even if a distance between two adjacent points is short or when the vehicle turns a corner gently.

It is a third object of the present invention to provide a navigation system which can reliably determine a area judge value so as to provide an indication that the vehicle has entered into a route judge area even if there exists a long curved road on the map.

It is a fourth object of the present invention to provide a navigation system which can display the vehicle location in a naturally appearing manner at each branch point even within the route judge.

To achieve the above-mentioned object, the navigation system for displaying travel locations of a vehicle on a displayed map, according to the present invention comprises: (a) means for detecting vehicle travel angle; (b) means for detecting vehicle travel distance; (c) means, coupled to said vehicle travel angle detecting means and said vehicle travel distance detecting means, for calculating vehicle locations on the basis of detected vehicle travel angles and distances; (d) means for storing map information data including branch points; (e) means, coupled to said map information data storing means, for setting a route judge area at each branch point to determine a route along which the vehicle travels at a branch point; (f) means, coupled to said vehicle distance detecting means, said map storing means and said route judge area setting means, for determining the condition of a vehicle passing into the set route judge area when a distance between a current vehicle location and a succeeding branch point becomes shorter than a predetermined value and the condition of a vehicle passing through the set route judge area when a distance between a position at which vehicle passing into the set route judge area is determined and a current vehicle location becomes longer than a predetermined value; (g) means, coupled to said vehicle travel angle detecting means and said route judge area pass determining means, for determining travel route at each branch point by comparing a travel angle detected by said travel angle detecting means with map data stored in said map data storing means when the vehicle has passed through the set route judge area; (h) means, coupled to said vehicle location calculating means and said travel route determining means, for correcting calculated vehicle locations so as to be located along a road on a displayed map, said vehicle location calculating means further correcting a vehicle after-turn location at each branch point by matching a vehicle turn point obtained when said route judge area pass determining means detects that the vehicle has passed through a route judge area to a map branch point within the route judge area; and (i) means, coupled to said correcting means, for displaying a map stored in said map information data storing means and vehicle locations corrected by said correcting means.

The route judge area setting means sets an area pass judge value to detect a route judge area adjustably according to route conditions to an adjacent branch point or increases a route judge area by increasing the area pass judge value when the vehicle travel angle detecting means detects a travel angle beyond a predetermined value.

Further, the route judge area setting means sets an area pass judge value to detect a route judge area by integrating plural area judge values between two adjacent points within a curved road.

Further, vehicle locations are displayed without correction only within the route area judge area.

In summary, to achieve the first object, when the vehicle has passed through a branch point, the current vehicle location is corrected to the map branch point.

To achieve the second object, an area pass judge value for determining that the vehicle has passed through a route judge area is adjustably determined according to adjacent route conditions and increased when vehicle travel angle exceeds a predetermined angle to prevent an error such that travel route change is determined before the vehicle has actually turned a branch point corner.

To achieve the third object, plural area judge values between two adjacent points within a curved road are integrated.

To achieve the fourth object, vehicle travel locations are displayed on the basis of non-corrected vehicle locations within each route judge area.

BRIEF DESCRIPTION OF THE DRAWINGS

The features and advantages of the navigation system using an angular rate sensor according to the present invention will be more clearly appreciated from the following description of the preferred embodiment of the invention taken in conjunction with the accompanying drawings in which like reference symbols designate the same or similar elements or sections throughout the figures thereof and in which.

DETAILED DESCRIPTION OF THE PREFERRED EMBODIMENTS

With reference to the attached drawings, a basic configuration of the navigation system using angular rate sensor will be described hereinbelow in more detail.

Figure 4:
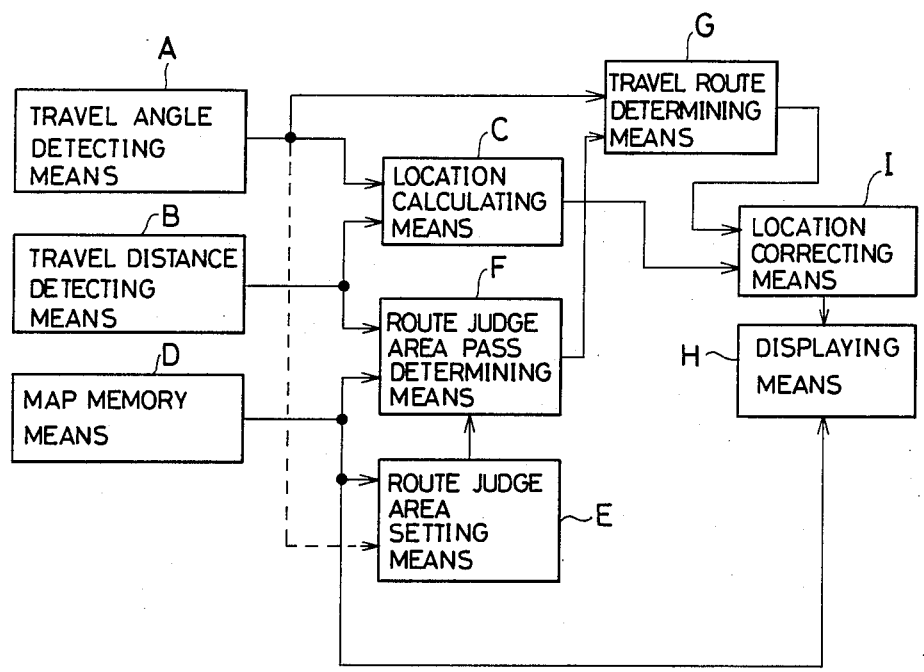
FIG. 4 is a basic block diagram of the navigation system of the present invention.

FIG. 4 shows a schematic block diagram showing a basic configuration of an embodiment of the system according to the present invention. In FIG. 4, the navigation system comprises travel angle detecting means A for detecting a travel angle ($\theta = \int$ wdt) of an automotive vehicle on the basis of a signal W from an angular rate sensor; travel distance detecting means B for detecting a travel distance of the vehicle; location calculating means C for calculating a current vehicle location on the basis of the signals from the travel angle detecting means and the travel distance detecting means; map memory means D for storing survey map data including various point coordinates of intersections, branches and inflections of roads; route judge area setting means E for setting a route judge area at each branch point to determine a route along which the vehicle travels at a branch point; route judge area pass determining means F for determining that a vehicle passes into a set route judge area when a distance between a current vehicle location and a succeeding branch point becomes shorter than a predetermined value and for determining that a vehicle passes through the set route judge area when a distance between a position at which vehicle passing into the set route judge area is determined and a current vehicle location becomes longer than a predetermined value; travel route determining means G for determining a vehicle travel route by comparing a travel angle detected by the travel angle detecting means with map data stored in the map data storing means when the vehicle has passed through the set route judge area; location correcting means I for correcting the calculated vehicle location on the judged map route; and displaying means for displaying the corrected vehicle location on the map.

Figure 5:
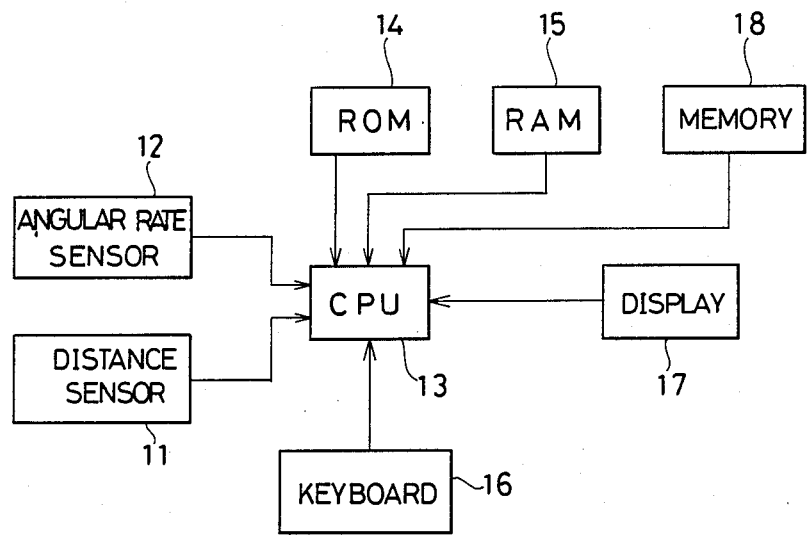
FIG. 5 is an actual block diagram of the navigation system of the present invention.

FIG. 5 shows a block diagram of the system of the present invention. In the drawing, the system comprises a travel distance sensor 11 for generating a signal indicative of the vehicle distance; an angular rate sensor 12 such as a vibrating gyrosensor for detecting vehicle angular velocity; and a CPU 13 for receiving signals outputted from the travel distance sensor 11 and the angular rate sensor 12. The CPU 13 operates in accordance with programs stored in a ROM 14 to execute various operations by reading various data from the RAM 15 and writing the processed data in the RAM 15. Further, the CPU 13 is connected to a keyboard 16 for entering data, a display unit such as CRT, and a memory 18 for storing survey map information data.

Figure 6:
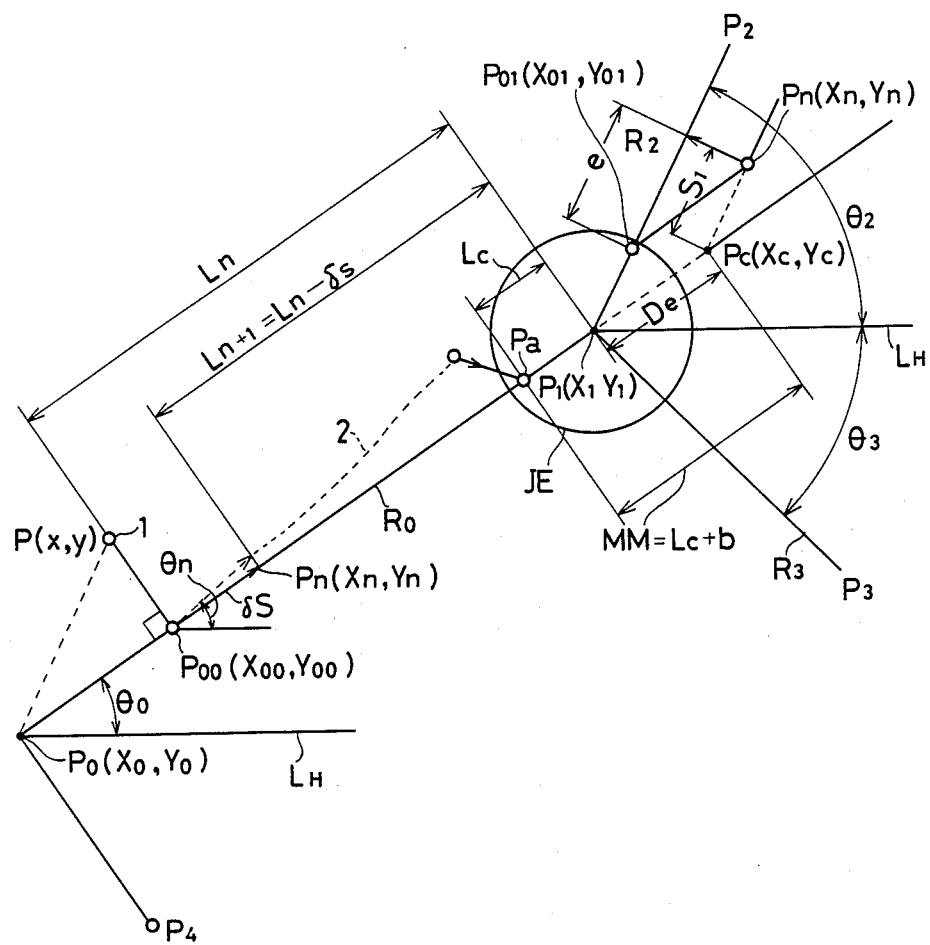
FIG. 6 is a diagram for assistance in explaining the correction operation of the navigation system of the present invention.

FIG. 6 shows a diagram for assistance in explaining the map correction method of the present invention. A point P(x, y) 1 is first initialized to $P_{00}(X_{00}, Y_{00})$. An actual travel route 2 shown by dashed line is calculated by the distance sensor and the angular rate sensor, and compared with map data $R_0$. As a result, vehicle locations are displayed on a map on a CRT screen using symbols. The broken line 2 is a route detected by the sensors and projected to the map route R for correction and this is not displayed on the CRT map. Data for the displayed map are prepared based on a survey map including intersections or inflections of roads (referred to as points and straight lines). The portion between two points is approximate by a straight line. The map is digitally coordinated for each point and stored in the ROM.

In order to remove errors due to the straight line approximation of the map, a certain range referred to as "route judge area JE" is set up at each point at the rate proportional to the distance between two points $P_0$ and $P_1$. In this area JE, judgement of a change in vehicle travel direction and correction of errors are implemented. Within the area judge area, the route or location calculated by the distance sensor and the angular rate sensor is displayed without coordinate correction to the map. However, when the vehicle passes out of the area judge area, the symbol indicating the vehicle location is displayed along the map after correction.

The map data stored in the memory 18 are position data expressed by X-Y coordinates of branch points such as intersections, inflections of roads as shown in FIG. 6 and includes the number of the points and the numbers of other points adjacent thereto.

In more detail, the position data of a route as shown in FIG. 6 are as follows:

| Point No. | X | Y | Adjacent point Nos. | Flag (P) |
|---|---|---|---|---|
| $P_0$ | $X_0$ | $Y_0$ | $P_1, P_4$ | 1 |
| $P_1$ | $X_1$ | $Y_1$ | $P_0, P_1, P_3$ | 1 |
| $P_2$ | $X_2$ | $Y_2$ | $P_1$ | 0 |
| $P_3$ | $X_3$ | $Y_3$ | $P_1$ | 0 |
| : | : | : | : | |
| : | : | : | : | |
| : | : | : | : | |
| $P_n$ | | | | |

In the table, the coordinates of the point $P_0$ are $(X_0, Y_0)$ and the adjacent points thereof are $P_1$ and $P_4$. The coordinates of the point $P_1$ are $(X_1, Y_1)$ and the adjacent points thereof are $P_0$, $P_1$ and $P_3$ and so on.

Further, in this table, information data related to the adjacent point is stored in the form of flag P. For instance, if flag is 1 at $P_0$, this indicates that there exists a special point to the adjacent point $P_1$ or $P_4$. The special point is a place having a very short distance to the adjacent point, so that the ordinary route judgement processing is disabled.

The operation of the system will be explained in accordance with a flowchart shown in FIGS. 7 to 9 by taking an example where a vehicle travels from a point $P_{00}(X_{00}, Y_{00})$ to a point $P_1(X_1, Y_1)$ along a route $R_0$ connecting two points $P_0(X_0, Y_0)$ and $P_1(X_1, Y_1)$ on a map shown in FIG. 6. Further, in FIG. 6, the dashed lines indicate calculated vehicle route (not displayed).

The initial location $P_{00}(X_{00}, Y_{00})$ and two points $P_0(X_0, Y_0)$ and $P_1(X_1, Y_1)$ along a route $R_0$ are entered through the keyboard 16 and stored in the RAM 15 for initialization (in step $S_1$). The entered current position and map data including roads and place names are displayed (in step $S_2$). In this step $S_2$, the current vehicle location $P(x, y)$ is corrected on the route R.

A gradient $\theta_0$ of the route $R_0$ with respect to a base line $L_H$ (positive in the counterclockwise direction) is calculated on the basis of two points $P_0(X_0, Y_0)$ and $P_1(X_1, Y_2)$ as follows:

$$\theta_0 = \tan^{-1}|(Y_0-Y_1)/(X_0 \cdot X_1)|$$

In the same way, gradients $\theta_2$ and $\theta_3$ with respect to the base line $L_H$ are calculated on the basis of the two adjacent points $P_1$, $P_2$, and $P_3$ (in step $S_3$).

In the succeeding step, a distance $L_n$ between $P_{00}$ and $P_1$ is calculated as follows (in step $S_4$):

$$L_n = \sqrt{(X_1-X_{00})^2+(Y_1+Y_{00})^2}$$

Figure 8:
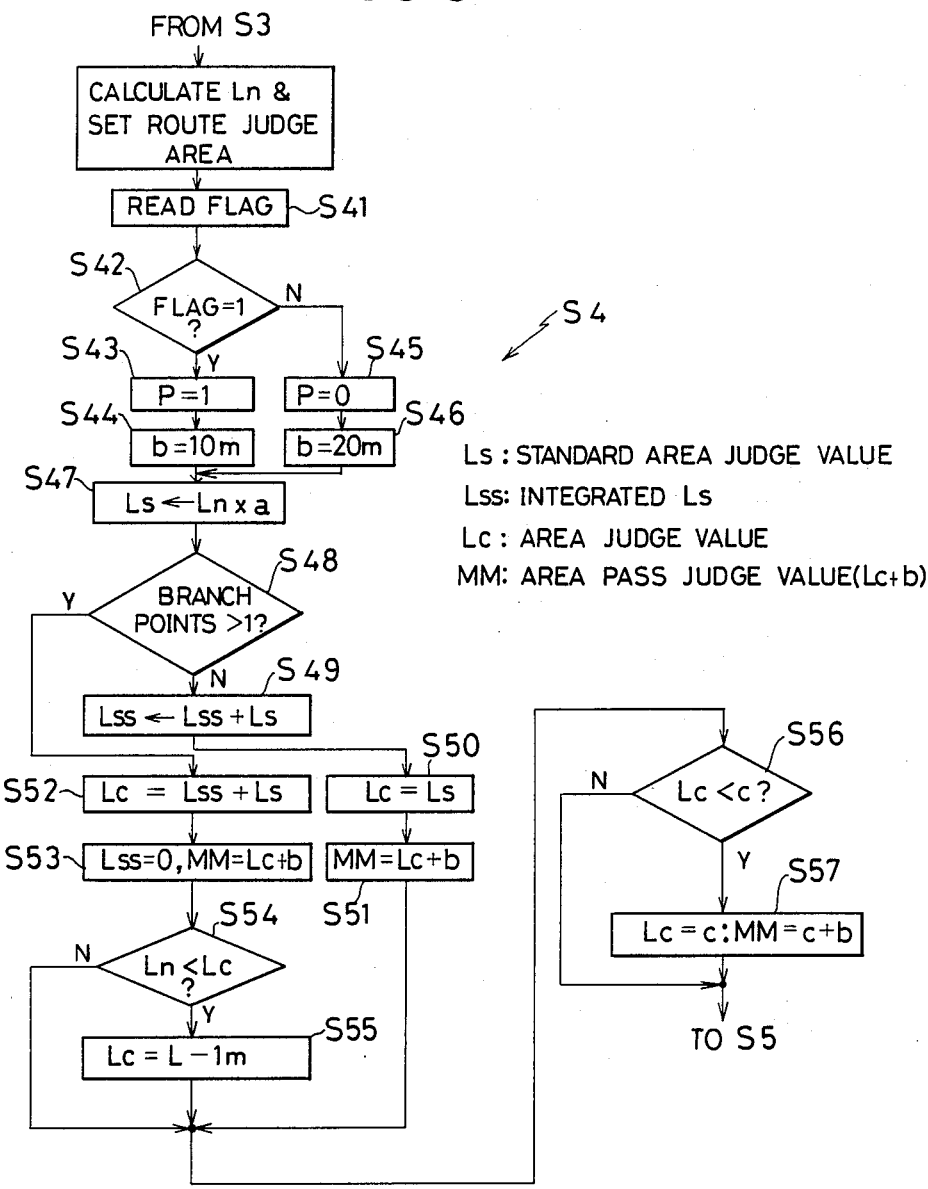
FIG. 8 is a flowchart showing a subroutine of block $S_4$ shown in FIG. 7.

Thereafter, an area judge value $L_c$ and an area pass judge value MM are determined in accordance with a flowchart shown in FIG. 8 in order to set a route judge area JE (in step $S_4$).

Flags P are read from map data (in step $S_{41}$) and control determines whether the read flag is 1 (in step $S_{42}$). If YES, control sets the succeeding route flag P to 1 (in step $S_{43}$) and sets b to 10 m, for instance (in step $S_{44}$). On the other hand, if NO in step ($S_{42}$), control sets the succeeding route flag P to 0 (in step $S_{45}$) and sets b to 20 m, for instance (in step $S_{46}$). By doing this, the distance of the route judge area (area pass judge value) can be adjusted according to the succeeding route condition indicated by the flag P.

The standard distance (radius) $L_s$ of the area JE is calculated as $L_n \times a$ (in step $S_{47}$), where $L_n$ denotes a distance to the branch point $P_1$ and a denotes 0.1, for instance, if 10% of the distance $L_n$ is determined as the standard distance $L_s$.

Control checks the number of branch points (routes) (in step $S_{48}$). If NO (an inflection of a road), control calculates an integrated standard value $L_{ss}$ by integrating each standard value $L_s$ (in step $S_{49}$) along a curved road. This integrating calculation is continuously made until control determines an intersection in step $S_{48}$ and control proceeds to the step $S_{52}$.

After step $S_{49}$, an area judge value (distance) $L_c$ is set to the standard value $L_s$ (in step $S_{50}$) and an area pass judge value MM is set to $L_c + b$ (in step $S_{51}$). In step $S_{51}$, b is a constant (e.g. 20 m) indicative of distance surplus determined by considering a value $L_c$ to the succeeding point and left or right turn or inflection. However, this value b can be set to 0 m. In the case of a turning corner (inflection), although the succeeding point is decided, it is also possible to use the area judge value $L_c$ and the area pass judge value MM to determine that the vehicle has passed the corner point.

If YES (an intersection) in step $S_{48}$, the area judge value $L_c$ is calculated as $L_{ss}+L_s$, where $L_{ss}$ is an integrated standard area judge value at a turning corner point integrated in step $S_{49}$ (in step $S_{52}$). That is, in this step, the area judge value at an intersection is determined on the basis of a distance between two adjacent intersections, irrespective of the presence or absence of a turning corner point between two intersections.

Figure 13A:
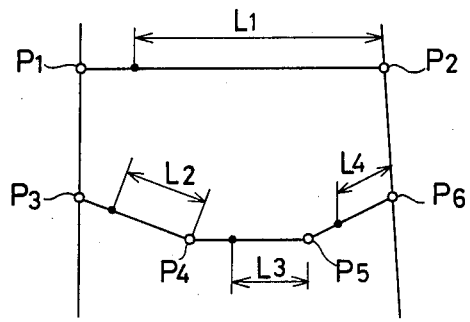
FIG. 13(A) is a diagram for assistance in explaining a third feature of the present invention, in which an area judge value is determined by adding each area judge value for each straight line within a curved road.

For instance, in the case of the routes as shown in FIG. 13(A), the area judge value to point $P_2$ from point $P_1$ is determined as $L_1 \times 0.1$, and the area judge value to $P_6$ from point $P_3$ is determined as $$L_2 \times 0.1 + L_3 \times 0.1 = L_{ss}$$

$$L_4 \times 0.1 = L_s$$

$$L_{ss}+L_s = (L_2+L_3+L_4) \times 0.1$$

Further, black dots shown in FIG. 13(A) indicate corrected vehicle locations.

Thereafter, the integrated standard value $L_{ss}$ is set to 0 and the area pass judge value MM is calculated as $L_c + b$ (b: 20m) (in step $S_{53}$). By doing this, it is possible to determine an area judge value at an intersection large enough to cover an error produced at a turning corner point or inflection. Control checks whether the area judge value $L_c$ is larger than the distance $L_n$ between the current location and the succeeding point (in step $S_{54}$). If YES, 1 m is subtracted from $L_n$ to obtain a new area judge value $L_c$ (in step $S_{55}$). If NO, control skips step $S_{55}$ to step $S_{56}$.

Control determines whether the area judge value $L_c$ is smaller than c (e.g. 10 m) (in step $S_{56}$). If YES, the area judge value $L_c$ is set to c and the area pass judge value MM is set to $c+b(10 \text{ m}+20 \text{ m})$ (in step $S_{57}$), proceeding to the step $S_5$ shown in FIG. 7. In summary, steps 56 and 57 can determine the minimum area judge values $L_c$ and MM. As described above, the route judge area including an area judge value $L_c$ and an area pass judge value MM has been determined under considerations of route conditions to an adjacent point and straight routes within a curved road. Thereafter, control proceeds to step $S_5$ shown in FIG. 7.

With reference to FIG. 7 again, each data is set (in step $S_5$) as follows:

$\delta S_n$ (sampling distance)$=0$, $\delta\theta_n=0$, $X_n=X_{00}$, $Y_n=Y_{00}$, $\theta_n=\theta_0$ Further, the calculated data $\theta_0$, $\theta_2$, $\theta_3$, $L_n$, $\delta S_n=0$, $\delta\theta=0$, $X_n=X_{00}$, $Y_n=Y_{00}$ are all stored in the RAM 15 for sampling calculation of each vehicle travel distance $\delta S_n$ and each vehicle travel angle $\delta\theta_n$. (in step $S_5$).

Figure 9:
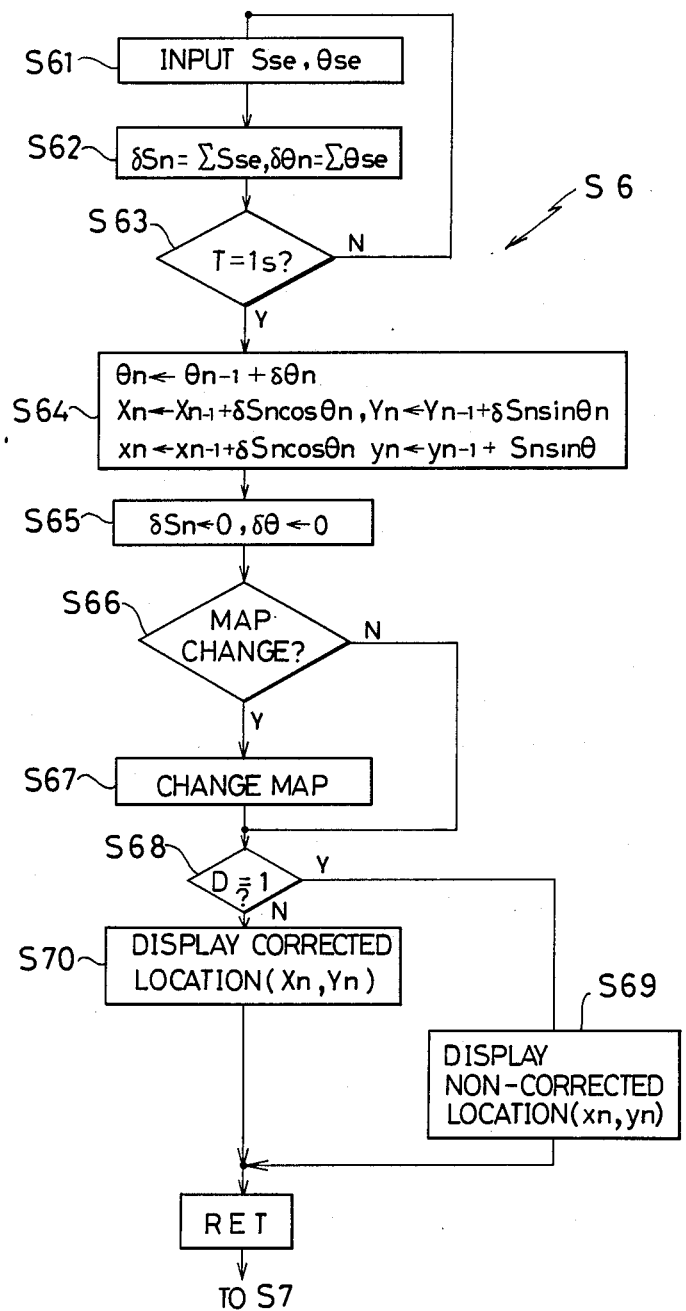
FIG. 9 is a flowchart showing a subroutine of block $S_6$ shown in FIG. 7.

The next sampling calculation (step $S_6$) can be implemented in accordance with a subroutine as shown in FIG. 9.

Each travel distance signal $S_{se}$ from the travel distance sensor 11 and each travel angle signal $\theta_{se}$ ($\int$wdt) from the angular rate sensor 12 are both inputted (in step $S_{61}$).

Further, the obtained travel distance $S_{se}$ and the travel angle $\theta_{se}$ are integrated to obtain $\delta S_n=\delta S_{se}$ and $\delta\theta_n=\delta\theta_{se}$ (in step $S_{62}$), and then CPU checks whether a predetermined time (e.g. 1 sec) has elapsed (in step $S_{63}$). If YES, the integrated angle value $\delta\theta_n$ is added to the current angle $\theta_{n-1}$ stored in the RAM 15 to obtain an updated angle value $\theta_n$. The obtained value $\theta_n$ is stored in the RAM 15. On the basis of the current angle value $\theta_n$, the current corrected location $P_n(X_n, Y_n)$ can be obtained as follows (in step $S_{64}$):

$X_n = X_{n-1} + \delta S_n \cos\theta_n$ $Y_n = Y_{n-1} + \delta S_n \sin\theta_n$ where $P_{n-1}(X_{n-1}, Y_{n-1})$ are coordinates stored in the RAM 15 as the preceding location such as $P_{00}(X_{00}, Y_{00})$. By the above correction, it is possible to correctly track the vehicle travel trace along the road on the map.

In the same way, on the basis of the calculated angle value $\theta_1$, the current non-corrected (sensor-detected) location $P(x_n, y_n)$ can be obtained as follows (in step $S_{64}$):

$x_n = x_{n-1} + \delta S_n \cos\theta_n$ $y_n = y_{n-1} + S_n \sin\theta_n$

By the above calculation, it is possible to display the current vehicle location as it is without correction on the map.

In the above-mentioned tracking on the map, the tracking display moves $\delta S_n$ by $\delta S_n$ from a designated point $P_{00}$ along a route $R_0$ connecting $P_{00}$ and $P_1$ (in step $S_{64}$). Thereafter, the integrated travel distance $\delta S_n$ and the integrated travel angle $\delta\theta_n$ are reset when the vehicle reaches a route judge area (in step $S_{65}$).

Control checks whether it is necessary to change the map now displayed on the basis of the current location coordinates $P_n(X_n, Y_n)$ and/or $(x_n, y_n)$ (in step $S_{66}$). If YES, the map is changed (in step $S_{67}$). If NO, control skips step $S_{67}$ to step $S_{68}$. Control checks whether flag is 1 (in step $S_{68}$). This flag D determines coordinates of the current location to be displayed. If YES (D=1 in step $S_{68}$), the current location is displayed by the non-corrected coordinates $(x_1, y_1)$ based upon the sensors. If NO (D=0 in step $S_{68}$), the current location is displayed by the corrected coordinates $(X_1, Y_1)$ based upon the coorecting calculation. That is, the displayed coordinates are determined by this flag D. Thereafter, control returns to step $S_7$ shown in FIG. 7.

Returning to FIG. 7, CPU checks whether the number of routes selectable at the next point $P_1$ (i.e. the number of branch points) is more than 1 (in step $S_7$). If NO, flag B is set to 1 (in step $S_8$) and proceeds to step $S_9$. If YES, CPU directly proceeds to step $S_9$. Control checks whether the integrated travel distance $\delta S_n$ is zero (in step $S_9$). If YES, since this indicates that the vehicle is kept stopped, control returns to step $S_6$. If NO, since this indicates that the vehicle is moving, control proceeds to the succeeding step. The current distance $L_n$ between $P_{00}$ and $P_1$ is set as $L_n = L_{n-1} - \delta S_n$ (in step $S_{10}$). That is, in FIG. 6, a travel distance $\delta S_n$ is subtracted from the distance $L_n$ between two points $P_{00}$ and $P_1$ to obtain an updated distance $L_{n+1}$ to the point $P_1$. Control checks whether the updated distance $L_n$ becomes less than an area judging valve $L_c$ (e.g. 20 m) indicative of the range of the route judge area JE (in step $S_{11}$). If NO, control returns to the step $S_6$. If YES, control proceeds to the succeeding step because this indicates that the vehicle approaches a branch point. Therefore, the $L_m$ (distance between the current point to the branch point $P_1$) is set to zero and the flag D is set to 1 in order to display the current location on the basis of the non-corrected location $(x_n, y_n)$ (in step $S_{12}$). Control proceeds to the step $S_{13}$ (the same as step $S_6$ shown in FIG. 9). In this step $S_{13}$, the sampling calculation starts.

In the succeeding step, control sets $L_{m-1} + \delta S_n = L_m$ (in step $S_{14}$). That is, in FIG. 6, a travel distance $\delta S_n$ is integrated to obtain a distance away from a point $P_a$ where the vehicle enters the route judge area JE. Thereafter, control checks whether $L_m$ exceeds an area pass judge value MM (e.g. 30 m) (in step $S_{15}$). If NO, control returns to the step $S_{13}$ to continuously obtain travel distance $\delta S_n$. If YES, since this indicates that a distance $L_m$ away from a position $P_a$ where the vehicle enters into the route judge area JE exceeds an area pass judge valve MM (e.g. 30 m) at the branch point $P_1$, control determines that the vehicle has passed through the branch point $P_1$.

After control determines that the vehicle has passed through the point $P_1$ in step $S_{15}$, control checks whether the angle change $\delta\theta_n$ is 20 degrees/sec or more or not (in step $S_{16}$). If $\delta\theta_n$ is more than 2 deg/sec, control determines that the vehicle is not yet turned completely, proceeding to the step $S_{17}$. Control checks the route condition of the succeeding point on the basis of the flag P (indicative of a special point at the next route set in step $S_{43}$ or $S_{45}$ (in step $S_{17}$). If P=1, since this indicates that there exists a special point (e.g. short distance) in the succeeding route and therefore it is impossible to provide an extension for the area pass judge value MM, control proceeds to step 18. If P=0, since this indicates that there exists no special point in the succeeding route, control proceeds to step $S_{18}$ to provide an extension. Here, a value b(e.g. 30 m) is added to $L_c$ to obtain $MM = L_c + b$ (in step $S_{18}$). By doing this, the area pass judge value MM can be extended.

Control checks again whether the $L_m$ (a distance away from a point $P_a$ where the vehicle enters into the area JE) exceeds MM (area pass judge value) (in step $S_{19}$).

If $L_m > MM$ control proceeds to step $S_{20}$. If $L_m < MM$, control returns to step $S_{13}$ to continue integrating calculation of distance and angle for determining the route area.

Control sets flag D to 0 (in step $S_{20}$) to display the current location on the basis of coordinates $(X_n, Y_n)$ of corrected data, because the location passed out of the area JE.

Control checks whether the flag B is 1 (in step $S_{21}$). If NO (B≠1), since this indicates that there exists plural branch points, control proceeds to the succeeding step to determine a route along which the vehicle turns (in step $S_{22}$). For doing this, the current vehicle travel angle $\theta_n$ is compared with the angle $\theta_2$ (corresponding to the forward point $P_2$) and the angle $\theta_3$ (corresponding to the forward point $P_3$) both previously obtained in step $S_3$. When the vehicle angle $\theta_n$ is close to the angle $\theta_2$, for instance, it is determined that the vehicle turns along the road $R_2$ (in step $S_{22}$). On the other hand, if YES in step $S_{21}$ (B=1), since this indicates that the number of branches is one and therefore it is unnecessary to determine the route (in step $S_{22}$), and control directly proceeds to the succeeding step $S_{23}$.

Control reinitializes the current vehicle location and determines an updated initial location $P_{01}(X_{01}, Y_{01})$ (in step $S_{23}$), which is the first feature of the present invention. The updated initial location $P_{01}$ is displayed (in step $S_{24}$). Thereafter, control returns to step $S_3$.

Figure 1A:
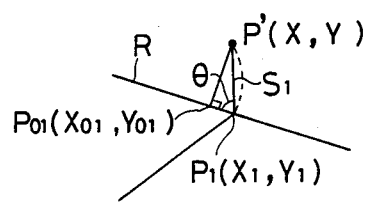
FIG. 1(A) is a diagram for assistance in explaining display correction of a prior-art navigation system.
Figure 1B:
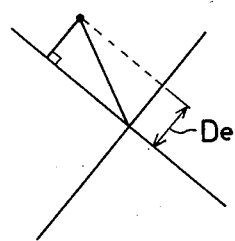
FIG. 1(B) is a diagram for assistance in explaining display correction at an intersection of the prior-art navigation system.
Figure 1C:
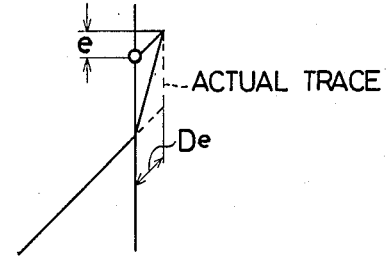
FIG. 1(C) is a diagram for assistance in explaining an error produced at a turning corner of the prior-art navigation system.

As already explained with reference to FIGS. 1(B) and (C), in the prior-art system, the vehicle location after the vehicle has passed through a branch point $P_1(X_1, Y_1)$ as shown by dashed lines in FIG. 6 is corrected on the basis of the point $P_n(x_n, y_n)$, so that there inevitably exists an error e. To eliminate this distance error e, the distance $S_1$ between $P_c(X_c, Y_c)$ (actual turn point) and $P_n(X_n, Y_n)$ (corrected current vehicle location) is calculated, and then the initialized vehicle location $P_{01}(X_{01}, Y_{01})$ can be calculated as $$S_1 = \sqrt{(X_c - X_n)^2 + (Y_c + Y_n)^2}$$

$$X_{01} = X_1 + S_1 \cos \theta_2$$

$$Y_{01} = Y_1 + S_1 \sin \theta_2$$

The above initialized location $P_{01}(X_{01}, Y_{01})$ is determined as a new location $P_{00}(X_{00}, Y_{00})$ for the succeeding tracking operation.

Figure 13B:
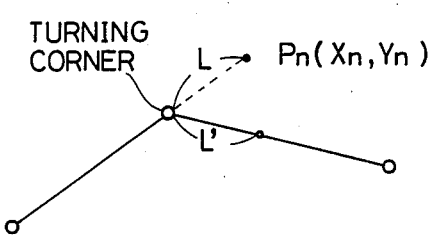
FIG. 13(B) is a diagram for assistance in explaining a method of displaying a vehicle location at a turning corner.

On the other hand, when the number of branch point is 1, since this indicates a single turning point (inflection) and therefore the succeeding route is known, a distance L between the branch point and the non-corrected location $P_n(x_n, y_n)$ determined when the vehicle passes through the route judge area JE is displayed as the current location on the route along which the vehicle travels, as shown in FIG. 13(B). In other words, at the turning corner, the current location is displayed on the new route on the basis of the actual non-corrected travel distance.

Thereafter, control returns from the step $S_{24}$ to the step $S_3$ to repeat the similar tracking operation. In this case, the point $P_1$ is regarded as the point $P_0$; the point $P_2$ is regarded as the point $P_1$; and the route $R_0$ is regarded as the route $R_2$ in the succeeding tracking operation.

Figure 10:
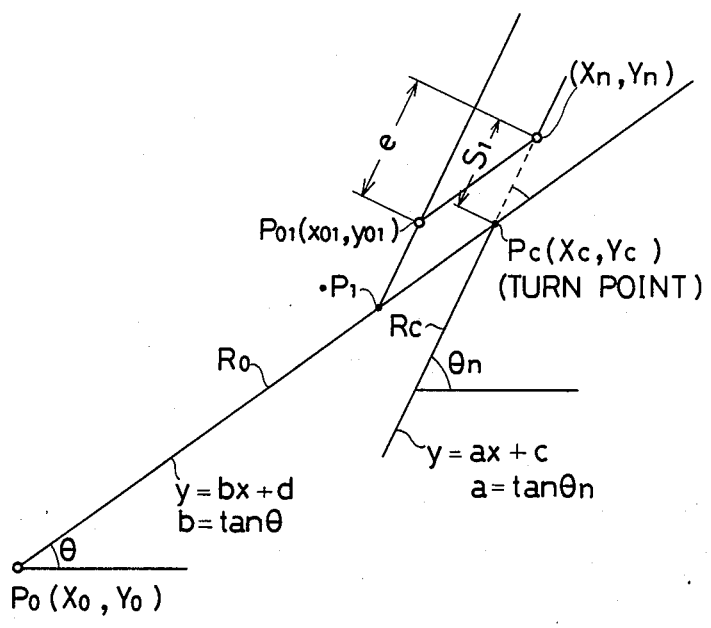
FIG. 10 is another diagram for assistance in explaining a first feature of the present invention, in which actual vehicle location $(x_n, y_n)$ is corrected to $(X_{01}, Y_{01})$ at a branch point $P_1$.

With reference to FIG. 10, the method of calculating the correcting intersection $P_c(X_c, Y_c)$ will be explained hereinbelow, which is the first feature of the present invention.

The route $R_0$ is expressed as a straight line as $y = bx + d$. In this equation, b is known as $\tan \theta$. On the other hand, d can be obtained as follows:
If the point $P_0(X_0, Y_0)$ is substituted into $y = bx + d$, $$Y_0 = bX_0 + d \text{ or } d = Y_0 - bX_0$$

If this expression is substituted into y, $$Y = bx + (Y_0 - bX_0) \tag{1}$$

On the other hand, a straight line $R_c$ passing through a turn point $P_c(X_c, Y_c)$ (whose turn angle has been determined (in step 16) as a gradient ($\theta_n$) is expressed as a straight line as $Y = ax + c$. In this equation, a is known as $\tan \theta_n$. On the other hand, c can be obtained as follows:
If the point $P_n(X_n, Y_n)$ is substituted into $y = ax + c$, $$Y_n = aX_n + c \text{ or } c = Y_n - aX_n$$

If this expression is substituted into y, $$Y = ax + (Y_n - aX_n) \tag{2}$$

On the basis of the above two equations (1) and (2), the correcting point coordinates $P_c(X_c, Y_c)$ can be obtained as follows:

$$Y = ax + (Y_n - aY_n) = bx + (Y_0 - bX_0)$$

$$\therefore (a-b)x = (Y_0 - Y_n) - (bX_0 - aX_n)$$

$$x = 1/(a-b)\{(Y_0 - Y_n) - (bX_0 - aX_n)\} \tag{3}$$

By substituting the above expression (3) into (1), $$Y = b/(a-b)\{(Y_0 - Y_n) - (bX_0 - aX_n)\} + (Y_0 - bX_0)$$

In the above equation, when $\theta$ and $\theta_n$ are 90 degrees (±1.5 degrees) or 270 degrees (±1.5 degrees), since $\tan \theta$ is infinite, $$X_c = X_n$$

$$Y_c = aX_n + (Y_n - aX_n) \text{ or}$$

Sine $\tan \theta_n$ is infinite, $$X_c = X_n$$

$$Y_c = bX_n + (Y_0 - bX_0)$$

Further, when $\theta_n$ is 10 degrees or less, no correction is made, and the current actual vehicle location can be displayed on the route.

As described above, in the first feature of the present invention, since the turn point along a correcting route $P_c$ (vehicle tracking route is turned after the vehicle has passed through a branch point by a predetermined distance) is corrected so as to match the corresponding branch point $P_1$ on the map, it is possible to eliminate distance error e produced at branch point $P_1$ without producing cumulative errors.

In the embodiment as described above, when the distance $L_n$ between the current location and the branch point becomes less than a predetermined distance $L_c$ (e.g. 20 m) (in step $S_{11}$), it is determined that the vehicle approaches a branch point or comes into a route judge area to set the distance $L_m$ to zero (in step $S_{12}$). Further, when the distance $L_m$ between the branch point and the current location becomes more than a predetermined distance MM (e.g. 30 m) (in step $S_{15}$), it is determined that the vehicle has passed through a branch point or goes out of a route judge area to check a change in vehicle travel angle (in step $S_{16}$).

Figure 2A:
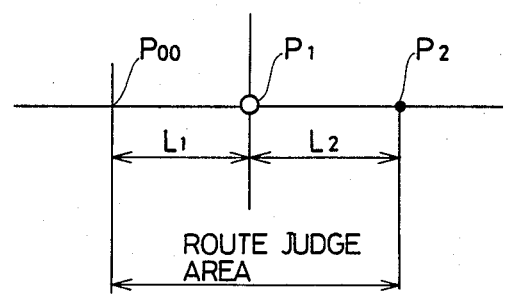
FIG. 2(A) is a diagram for assistance in explaining a fixed route judge area of the prior-art navigation system.
Figure 2B:
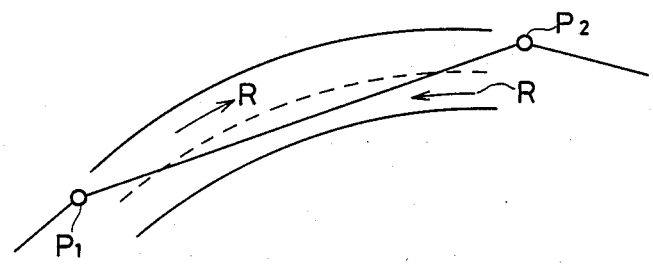
FIG. 2(B) is a diagram for assistance in explaining an error between an actual curved route and a straight route.
Figure 2C:
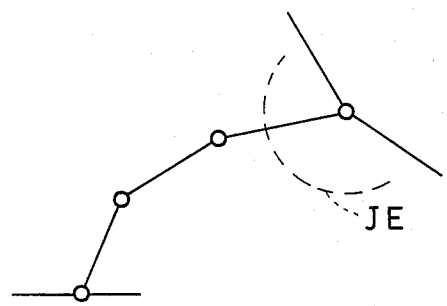
FIG. 2(C) is a diagram for assistance in explaining a cumulative error produced in a curved road.
Figure 2D:
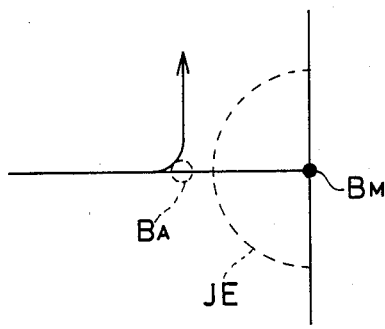
FIG. 2(D) is a diagram showing an erroneous operation involved in the prior-art navigation system.
Figure 2E:
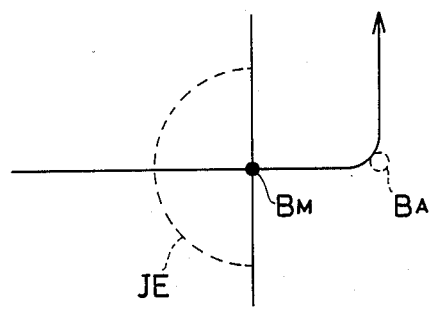
FIG. 2(E) is a diagram showing another erroneous operation involved in the prior-art navigation system.
Figure 3A:
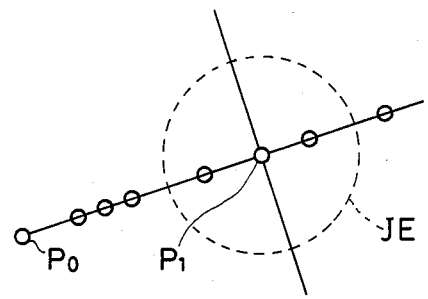
FIG. 3(A) is a diagram for assistance in explaining a non-natural display involved in the prior-art navigation system.
Figure 3B:
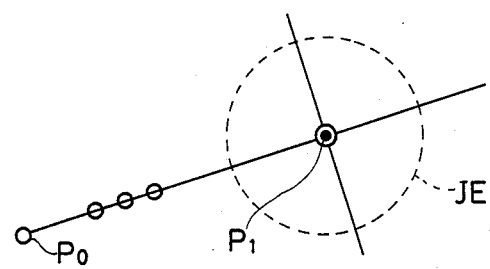
FIG. 3(B) is a diagram for assistance in explaining another non-natural display involved in the prior-art navigation system.

However, if the distance $L_c$ to the branch point P and the distance MM from the end of the route judge area are fixed and when two adjacent branch points P and $P_1$ is short, there exists a problem in that it is impossible to determine that the vehicle has passed through the branch point P because the vehicle passes through the next branch point $P_1$, as shown in FIG. 2(A). Further, when the route judge area JE ($L_1+L_2$) is fixed, it is impossible to determine a sufficient route judge distance for the succeeding point $P_1$.

To overcome this problem, the system of the present invention comprises route judge area setting means E for setting a route judge area at each branch point to determine a route along which the vehicle travels from the branch point in such a way that an area judge value ($L_c$) of the route judge area can be set adjustably according to route condition to an adjacent branch point, as explained with reference to steps $S_{41}$ to $S_{47}$.

Further, the route judge area setting means E increases a route judge area by increasing the area pass judge value (MM) when the vehicle travel angle detecting means detects a travel angle beyond a predetermined value, as explained with reference to steps $S_{16}$ to $S_{19}$.

The above route judge area setting means E changes the area judge value on the basis of map data to the adjacent branch point. Further, the above area judge setting means E increases the area pass judge value according to the vehicle travel angle detected by the travel angle detecting means.

That is, since the route judge area can be adjusted according to the conditions to the adjacent branch point, it is possible to reliably determine a route at each branch point. Further, since the area is determined large when the vehicle angle changes, it is possible to prevent an error such that the route is determined before the vehicle turns completely at a branch point.

Figure 11:
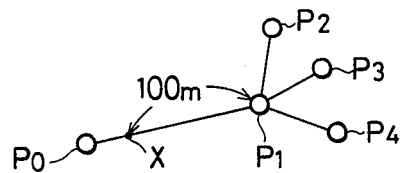
FIG. 11 is a diagram for assistance in explaining the route judgement operation of the navigation system of the present invention.

The above operation will be explained on the basis of practical values. In the flowchart, constants are determined as $a=0.1$, $b=20$ m, and $c=20$ m. In FIG. 11, the assumption is made that a route judgement operation is implemented at point $P_0$ on a route between $P_0$ and $P_1$ and coordinates of the current location is corrected at point x. Under these conditions, if a distance between the current location x and the succeeding point $P_1$ is 100 m, the flowchart shown in FIG. 8 checks the route conditions adjacent to the point $P_1$. When a short distance exists among the adjacent points $P_2$, $P_3$ or $P_4$, a flag $P=1$ is set and stored. Therefore, control reads this flag in step $S_{41}$, and therefore control determines $P=1$ in step $S_{43}$ and b is reduced to 10 m in step $S_{44}$. This indicates that it is impossible to increase the route judgement area. That is, in this case, an extension of the area is prohibited. In contrast with this, when the flag P is 0, $b=20$ m can be set and an extension of the area is enabled.

Figure 7:
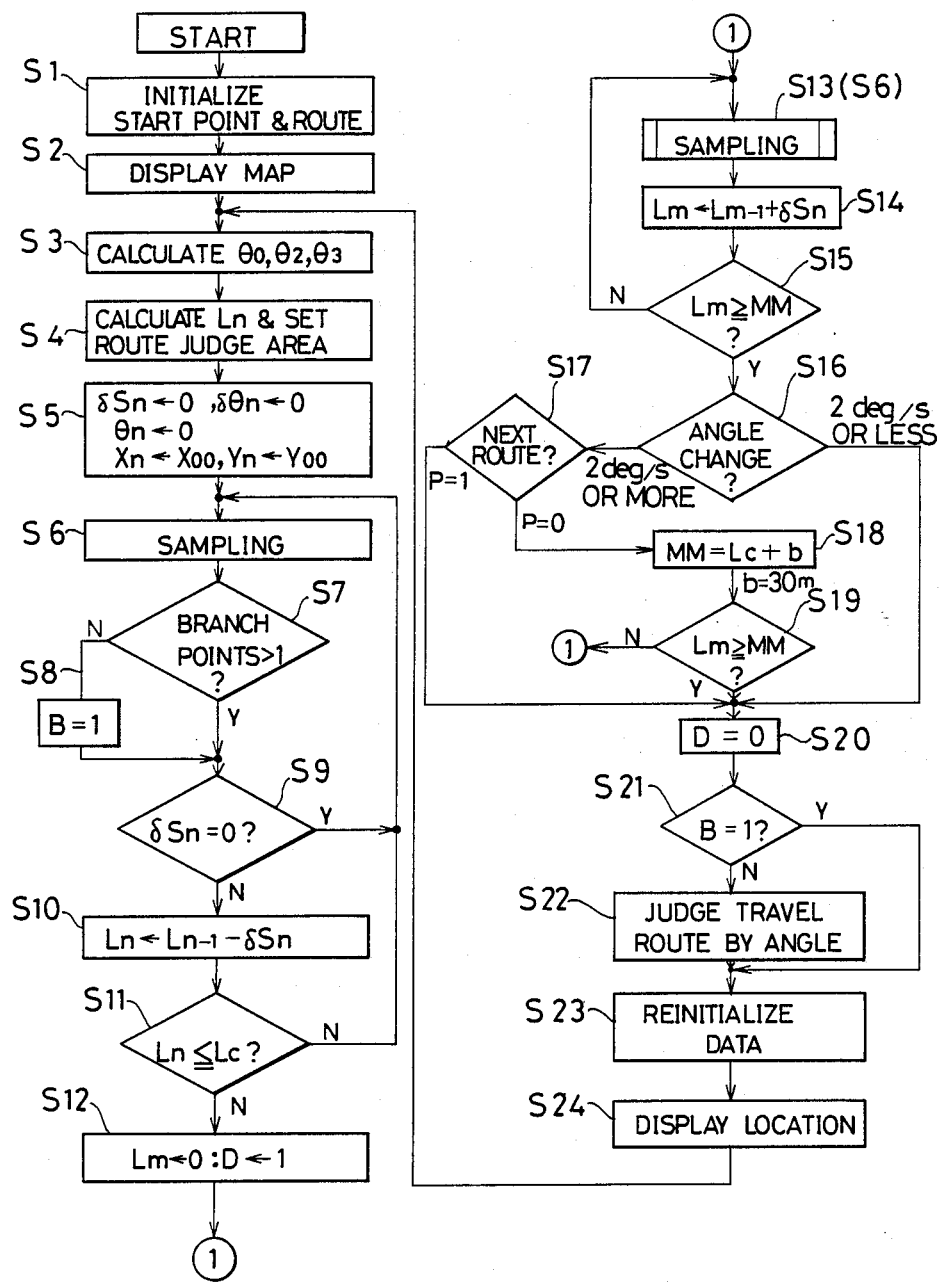
FIG. 7 is a flowchart for assistance in explaining the operation of the navigation system of the present invention.

The area judge values in the above setting operation are:

$L_{cc}=0$, $L_s=100\times0.1=10$ m $L_c=10$ m $<20$ m $=c$ $L_c<c$ $L_c=c=20$, $MM=c+b$ Therefore,
if flag $P=1$, $MM=20+10=30$ m
if flag $P=0$, $MM=20+20=40$ m Further, if flag $P=0$, an extension of $MM=20+30=50$ can be determined in the case of the step $S_{18}$ of FIG. 7.

Figure 12A:
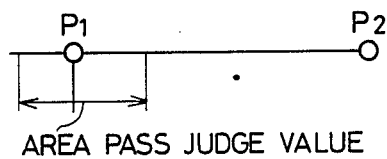
FIGS. 12(A), (B) and (C) are diagrams for assistance in explaining a second feature of the present invention, in which the area pass judge value is adjustable.
Figure 12B:
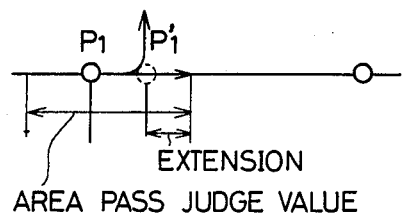
Figure 12C:
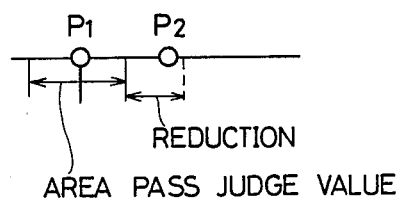

In summary, when the succeeding point $P_2$ is normally distant from the current point $P_0$, the normal area pass judge value MM can be determined as shown in FIG. 12(A) When the actual location $P_1'$ is dislocated from the point $P_1$ on the map, the value MM is increased (extension) as shown in FIG. 12(B). When the succeeding point $P_2$ is close to the current point $P_0$, the value MM is decreased (reduction) as shown in FIG. 12(C) or at least the extension is prohibited.

Figure 14:
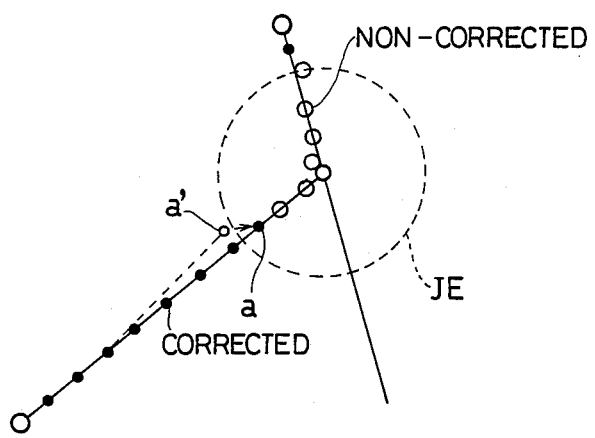
FIG. 14 is a diagram for assistance in explaining a fourth feature of the present invention, in which non-corrected locations are displayed within a route judge area.

In the system according to the present invention, when the vehicle enters into an route judge area JE in step $S_{11}$ (D=1) in FIG. 7, the actual non-corrected location a' (white dot) is corrected onto the map as shown by a (black dot) in FIG. 14. Thereafter, the non-corrected actual vehicle locations are displayed within the route judge area JE, so that the vehicle moves smoothly along the branch point.

As described above, according to the first feature of the present invention, since the vehicle travel location at each branch point is corrected by matching a turning point on a correcting route to a branch point on a map route, it is possible to minimize error at each branch point.

According to the second feature of the present invention, since route information to adjacent branch points are stored and the area judge value can be optimized according to the route condition, it is possible to reliably judge the vehicle route change at each branch point. Further, when vehicle travel angle changes beyond a predetermined value, since the area pass judge value can be increased, it is possible to further improve the reliability of vehicle route change judgement operation.

Further, the route judge value for determining whether the vehicle enters a route judge area is increased or decreased according to a distance between the current vehicle location and the succeeding branch point, it is possible to reliably determine a route judge area even if there exists an error between the actual point and the map point due to distance error or straight approximation on a curved road. In particular, when the vehicle is running along a curved road, since area judge values for each straight line route are added, it is possible to determine an accurate route judge area long a curved road.

Further, when the vehicle enters a route judge area, since the vehicle locations are displayed by the actual non-corrected locations detected by the travel distance and angle sensors, it is possible to display the vehicle motion at branch points in a natural fashion.

What is claimed is:

1. A navigation system for displaying travel locations of a vehicle on a displayed map, comprising:
   (a) means for detecting vehicle travel angle;
   (b) means for detecting vehicle travel distance;
   (c) means, coupled to said vehicle travel angle detecting means and said vehicle travel distance detecting means, for calculating vehicle locations on the basis of the detected vehicle travel angles and distances;
   (d) means for storing map information data including branch points;
   (e) means, coupled to said map information data storing means, for setting a route judge area at each branch point to determine a route along which the vehicle travels from a branch point;
   (f) means, coupled to said vehicle distance detecting means, said map storing means and said route judge area setting means, for determining a condition of a vehicle passing into the set route judge area when a distance between a current vehicle location and a succeeding branch point becomes shorter than a first predetermined distance and a condition of a vehicle passing through the set route judge area when a distance between a position, at which the vehicle enters the set route judge area, and a current vehicle location becomes longer than a second predetermined distance;
   (g) means, coupled to said vehicle travel angle detecting means and said route judge area pass determining means, for determining a travel route at each branch point by comparing a travel angle detected by said travel angle detecting means with map data stored in said map data storing means when the vehicle has passed through the set route judge area;
   (h) means, coupled to said vehicle location calculating means and said travel route determining means, for correcting said calculated vehicle locations so as to be located along a road on a displayed map in accordance with predetermined expressions, said vehicle location calculating means further correcting a vehicle after-turn location at each branch point by matching a vehicle turn point obtained when said route judge area pass determining means detects that the vehicle has passed through said route judge area with a map branch point within the route judge area; and
   (i) means, coupled to said correcting means, said map data storing means, said route judge area setting means, and said route judge area pass determining means, for displaying a map stored in said map information data storing means and vehicle locations calculated by said calculating means and corrected by said location correcting means.

2. The navigation system as set forth in claim 1, wherein the vehicle turn point ($P_c$) is obtained by calculating a point of intersection of a line ($R_c$) passing a vehicle location ($X_n$, $Y_n$), obtained when said route judge area pass determining means detects that the vehicle has passed through the route judge area (JE), with a gradient ($\theta_n$) detected by said vehicle travel angle detecting means and a stored line ($R_0$) along which the vehicle has traveled toward the branch points.

3. The navigation system as set forth in claim 1, wherein said route judge area setting means (E) sets an area judge value ($L_c$) of said route judge area adjustably according to a route distance to an adjacent branch point stored in said map data storing means.

4. The navigation system as set forth in claim 1, wherein said route judge area setting means (E) increases said route judge area by increasing an area pass judge value (MM) when said vehicle travel angle detecting means detects a travel angle beyond a predetermined angle.

5. The navigation system as set forth in claim 1, wherein when the vehicle travels along a curved road, each area judge value ($L_s$) for each divided straight route within the curved road is added to obtain an integrated area judge value ($L_c$) at the proceeding branch point.

6. The navigation system as set forth in claim 1, wherein said vehicle location displaying means displays vehicle locations on the basis of corrected vehicle location data ($X_n$, $Y_n$) projected on a map road when the vehicle is not traveling in the route judge area and on the basis of non-corrected vehicle location data ($x_n$, $y_n$) when the vehicle is traveling in the route judge area.

7. A method of displaying travel locations of a vehicle along a displayed map, which comprises the following steps of:
   (a) detecting vehicle travel angles;
   (b) detecting vehicle travel distances;
   (c) calculating vehicle locations on the basis of the detected vehicle travel angles and distances;
   (d) storing map information data including branch points;
   (e) setting a route judge area at each branch point to determine a route along which the vehicle travels from a branch point;
   (f) determining a condition of a vehicle passing into the set route judge area on the basis of a distance between a current vehicle location and a succeeding branch point and a condition of a vehicle passing through the set route judge area on the basis of a travel distance from a position at which the vehicle enters the route judge area and a current vehicle location;
   (g) determining a travel route by comparing a detected travel angle with the stored map data when the vehicle has passed through the set route judge area;
   (h) correcting the calculated vehicle locations so as to be located along a road on a displayed map in accordance with predetermined expressions;
   (i) correcting a vehicle location at each branch point by matching a vehicle turn point obtained when the vehicle has passed through said route judge area with a map branch point within the route judge area; and
   (j) displaying a stored map and the corrected vehicle locations corrected in steps (h) and (i).

8. The method of displaying travel locations of a vehicle as set forth in claim 7, wherein a vehicle after-turn location is corrected by calculating a point of intersection of a line ($R_c$) passing a vehicle location ($X_n$, $Y_n$) when the vehicle has passed through the route judge area (JE) with a gradient ($\theta_n$) and a stored line ($R_0$) along which the vehicle has traveled toward the branch point.

9. The method of displaying travel locations of a vehicle as set forth in claim 7, wherein an area judge value ($L_c$) of said route judge area is set adjustably according to route distances to a stored adjacent branch point.

10. The method of displaying travel locations of a vehicle as set forth in claim 7, wherein when a travel angle beyond a predetermined value is detected, an area pass judge value (MM) of the route judge area is increased.

11. The method of displaying travel locations of a vehicle as set forth in claim 7, wherein when the vehicle travels along a curved road, each area judge value ($L_s$) for each divided straight route within the curved road is added to obtain an integrated area judge value ($L_c$) at the proceeding branch point.

12. The method of displaying travel locations of a vehicle as set forth in claim 7, wherein when the vehicle is traveling out of an route judge area, corrected vehicle locations are displayed along a map road; and when the vehicle is traveling in said route judge area, non-corrected vehicle locations are displayed on the map.

* * * * *